(12) United States Patent
Young

(10) Patent No.: US 10,242,200 B1
(45) Date of Patent: Mar. 26, 2019

(54) STATIC ANALYSIS OF VULNERABILITIES IN APPLICATION PACKAGES

(71) Applicant: Tripwire, Inc., Portland, OR (US)

(72) Inventor: Craig Young, Alpharetta, GA (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 15/061,880

(22) Filed: Mar. 4, 2016

Related U.S. Application Data

(60) Provisional application No. 62/129,640, filed on Mar. 6, 2015.

(51) Int. Cl.
*G06F 21/57* (2013.01)
*G06F 17/30* (2006.01)

(52) U.S. Cl.
CPC ...... *G06F 21/577* (2013.01); *G06F 17/30952* (2013.01); *G06F 2221/033* (2013.01)

(58) Field of Classification Search
CPC ............. G06F 21/577; G06F 21/30952; G06F 2221/033
USPC ...................................... 726/25, 24
See application file for complete search history.

(56) References Cited

U.S. PATENT DOCUMENTS

| | | | |
|---|---|---|---|
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 8,914,341 B2 | 12/2014 | DiFalco | |
| 8,918,883 B1 | 12/2014 | Boyle et al. | |
| 2012/0072968 A1* | 3/2012 | Wysopal | G06F 11/3612 726/1 |
| 2014/0040979 A1* | 2/2014 | Barton | H04L 63/20 726/1 |
| 2014/0298472 A1 | 10/2014 | Kouskoulas et al. | |
| 2015/0242636 A1* | 8/2015 | Khan | G06F 21/577 726/25 |
| 2015/0248556 A1 | 9/2015 | Sickendick et al. | |

FOREIGN PATENT DOCUMENTS

| | | | | |
|---|---|---|---|---|
| WO | WO-2011002146 A2 * | 1/2011 | ........... | G06F 21/563 |

OTHER PUBLICATIONS

Pranith; Kumar D. et al, Hybrid Analysis of Executables to Detect Security Vulnerabilities; Feb. 23, 2009, ISEC 2009 all.*
"VERT Hack Lab Cheat Sheet," Oct. 2015, 2 pages.
(Continued)

*Primary Examiner* — Ashokkumar B Patel
*Assistant Examiner* — William B Jones
(74) *Attorney, Agent, or Firm* — Klarquist Sparkman, LLP

(57) ABSTRACT

Apparatus and methods are disclosed herein for analyzing computer programs for potential security vulnerabilities. In one computer-implemented embodiment of the disclosed technology, a method includes analyzing a package for an application (e.g., a mobile device application package) by disassembling at least a portion of executable code associated with the application, searching for a pattern associated with a potentially vulnerably function or method, and, if the function or method is defined, then analyzing disassembled code for the function to determine whether a vulnerability is present. In some examples, a number of packages are stored in an application store database and scanned periodically to statically analyze the package for vulnerabilities.

17 Claims, 5 Drawing Sheets

(56) References Cited

OTHER PUBLICATIONS

APKTOOL, "android-apktool," retrieved from https://code.google.com/p/android-apktool on Jan. 30, 2015, 3 pages.
Crenshaw, "10 Pineapple Abductions," YouTube Web Page of Video available at https://www.youtube.com/watch?v=FpZCM5EG6d4, published on Aug. 12, 2014, web page downloaded Jan. 30, 2015, 2 pages.
Dormann, "Announcing CERT Tapioca for MITM Analysis," document marked Aug. 21, 2014, downloaded on Jan. 30, 2015, 7 pages.
Tripwire, Inc., "Crawling the HTTP Interface," presented at BSides San Francisco [conference] on Feb. 23, 2014, 6 pages.
Tripwire, Inc., "DEFCON 22 Preview: Pineapple Abduction," YouTube Web Page of Video available at https://www.youtube.com/watch?v=9t1-ktPtPKI, published on Jul. 21, 2014, web page downloaded Jan. 30, 2015, 2 pages.
Young, "A Day in the Life (of a Security Researcher)," presented at BSides San Francisco [conference] on Feb. 23, 2014, 51 pages.
Young, "A Day in the Life (of a Security Researcher)," presented at BSides London [conference] on Apr. 29, 2014, 66 pages.
Young, "Configuring an SSL MITM Test Lab for Android | The State of Security," downloaded from http://www.tripwire.com/state-of-security/, Apr. 9, 2014, 5 pages.
Young, "Pineapple Abduction," presented at DEF CON 22 [conference] on Aug. 8, 2014, 43 Pages.

\* cited by examiner

FIG. 2

```
.method public checkServerTrusted([Ljava/security/cert/X509Certificate;Ljava/lang/String;)V
    .locals 0
    .parameter "chain"
    .parameter "authType"
    .annotation system Ldalvik/annotation/Throws;
        value = {
            Ljava/security/cert/CertificateException;
        }
    .end annotation .prologue
    .line 40
    return-void
.end method
```

FIG. 3

```
.method public final checkServerTrusted([Ljava/security/cert/X509Certificate;Ljava/lang/String;)V
    .locals 5 const/4 v1, 0x0 iget-object v0, p0, Lcom/paypal/android/sdk/ac;->c:Ljava/util/Set;

aget-object v2, p1, v1 invoke-interface {v0, v2}, Ljava/util/Set;->contains(Ljava/lang/Object;)Z move-result v0 if-eqz v0, :cond_0

:goto_0
    return-void

:cond_0
    new-instance v0, Lcom/paypal/android/sdk/Z;

iget-object v2, p0, Lcom/paypal/android/sdk/ac;->a:Lcom/paypal/android/sdk/ad;
```

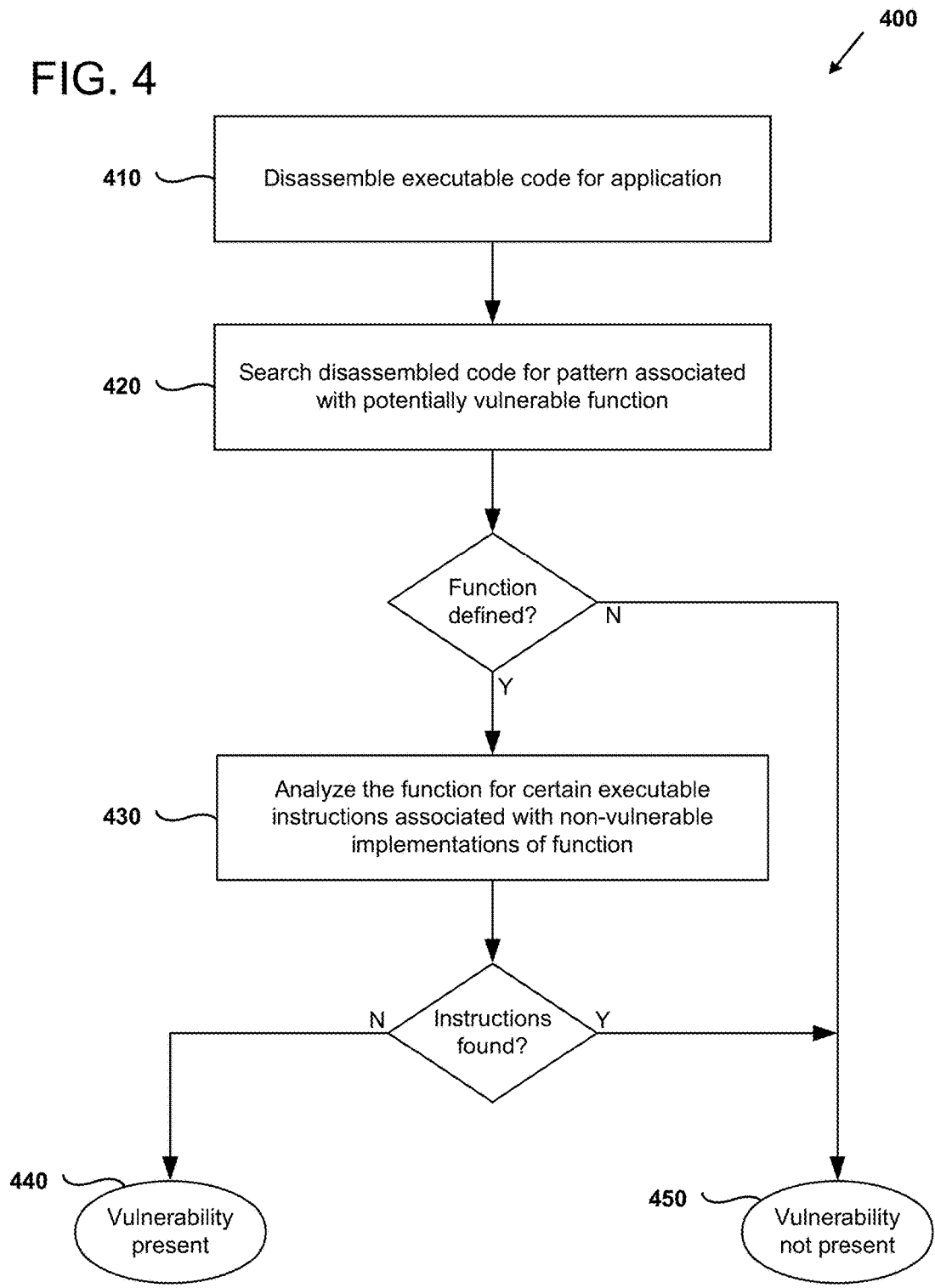

STATIC ANALYSIS OF VULNERABILITIES IN APPLICATION PACKAGES

CROSS REFERENCE TO RELATED APPLICATION

This application claims the benefit of U.S. Provisional Application No. 62/129,640, filed Mar. 6, 2015, which is incorporated by reference herein in its entirety.

SUMMARY

Apparatus and methods are disclosed herein for analyzing computer programs for potential security vulnerabilities. In one computer-implemented embodiment of the disclosed technology, a method includes analyzing a package for an application (e.g., a mobile device application package) by disassembling at least a portion of executable code associated with the application, searching for a pattern associated with a potentially vulnerably function or method, and, if the function or method is defined, then analyzing disassembled code for the function to determine whether a vulnerability is present.

In some examples, the analyzing comprises determining whether certain executable instructions associated with a non-vulnerable implementation of the function are present. If the instructions are present, then it is determined that the potentially vulnerably function or method has been implemented correctly. If the instructions are not present, then it is determined that the potentially vulnerably function or method has not been implemented correctly, as certain instructions associated with a secure implementation are not included in the function or method definition. If the potentially vulnerably function or method is not defined in the package, then the application is determined to not be vulnerable, as either the application does not implement the potentially vulnerable function or method, or is using a trusted default function or method provided by the system (e.g., by the operating system).

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures. Further, any trademarks used herein remain the property of their respective owners.

BRIEF DESCRIPTION OF DRAWINGS

FIG. 2 illustrates an example of disassembled code for an authentication function contained in an application package.

FIG. 3 illustrates another example of disassembled code for an authentication contained in an application package.

FIG. 4 is a flow chart that illustrates a method of statically checking for vulnerable applications as can be practiced in some examples of the disclosed technology.

DETAILED DESCRIPTION

Figure 1:
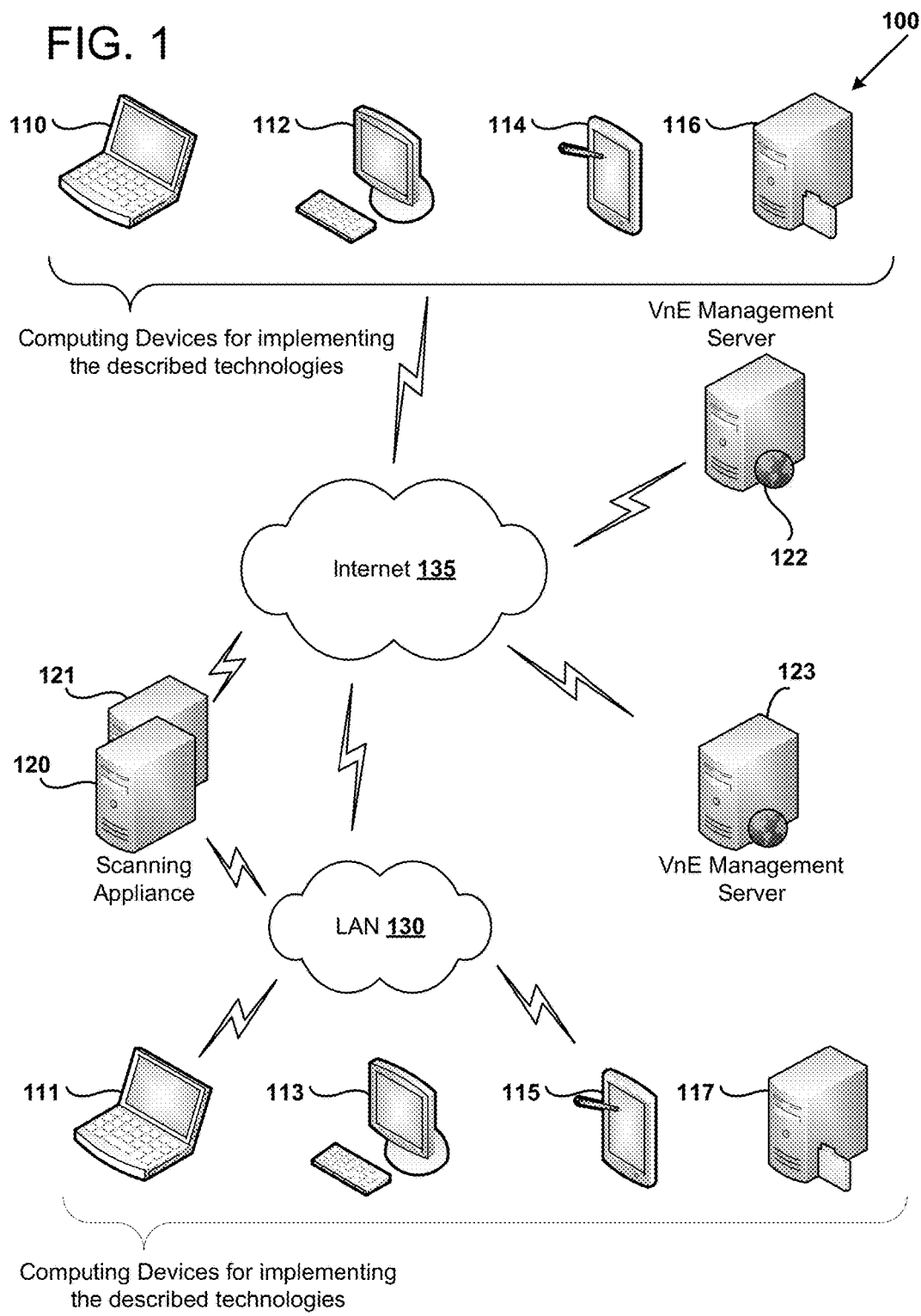
FIG. 1 illustrates a possible network topology for implementing methods of static analysis of vulnerabilities in application packages according to the disclosed technology.

I. General Considerations.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "disassemble," "analyze," "indicate," and "report" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as flash drives or hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Example Networking Environment for Implementing Embodiments of the Disclosed Technology An example of a possible network topology (e.g., a client-server network) for implementing methods of static analysis of vulnerabilities in application packages according to the disclosed technology is depicted in FIG. 1. As shown, a network diagram 100 illustrates a number of networked computing devices (e.g., laptops 110 and 111, desktop computers 112 and 113, touch screen tablets 114 and 115, and file servers 116 and 117). The computing devices can communicate with one or more central computers (e.g., scanning appliance(s) 120 and 121, and/or Vulnerability and Exposure (VnE) management server(s) 122 and 123). Each of the scanning appliances 120 and 121 can host one or more device profiler processes that can scan applications packages stored on any of the computing devices 110-117 over a computer network. For example, in some examples, the scanning appliances 120 and 121 are configured as external Session Message Block (SMB or Samba) clients that send traffic to one or more of the VnE management servers 122 and/or 123. In other examples, some or all of the computing devices are configured to locally host profiler processes that send data to the VnE management servers. In some examples, the scanning appliances 120 and 121 and the management servers 122 and 123 are hosted on the same virtual and/or physical computing host.

The computing devices 110-117 can communicated with each other and the central computers 120-123 via a local area network (LAN) 130, the Internet network 135, a wide area network, cellular network, WiFi, and/or other suitable computing networks. The computing devices 110-117 can be, for example, computers running a browser, plug-in, or other software that communicates with one or more central computers via a computer network. The computing devices 110-117 and the central computers 120-123 can have computer architectures as shown in FIG. 4 and discussed in further detail below. The computing devices are not limited to traditional personal computers but can comprise other computing hardware configured to connect to and communicate with a network (e.g., smart phones or other mobile computing devices, servers, network devices, dedicated devices, and the like).

In some examples, one or more of the computing devices 110-120 are configured to host an application store for distributing software applications over a computer network such as the Internet 135. In other examples, private networks, virtual private networks, cellular networks, or other suitable networks can be employed to provide data, including computer-executable instructions, for the applications hosted in the application store.

In the illustrated embodiment, the computing devices 110-117 are configured to communicate with one or more central computers 120-123 (e.g., using a cloud network or other client-server network). In certain implementations, the central computers 120-123 execute software for performing any of the disclosed disassembly, analysis, and reporting functionalities, for implementing any of the disclosed graphical user interfaces, and/or for computing any one or more of the intermediate or final values associated with the disclosed embodiments. The central computers 120-123 can transmit data to any of the computing devices (e.g., data to be displayed on a graphical user interface or web page at the computing devices). For example, the computing devices 110-117 can transmit a request for data to one or more central computers over a network (e.g., the LAN 130 or the Internet 135). In order to provide the data, the one or more central computers 110-117 can access data from the computing devices 120-123 (e.g., computing devices or other devices associated with assets in the IT infrastructure administered by the IT administrator), which can store various types of data used by the IT administrator. For example, the computing devices 110-117 may store device configuration data, application package data, decompiled computer instructions, and other such data used by any of the disclosed disassembly, analysis, and reporting tools. Alternatively, the one or more central computers 120-123 may themselves store the configuration data, application package data, decompiled computer instructions, and other such data.

As used herein, "disassembly" includes techniques for translating lower-level computer instructions into higher-level computer instructions. For example, machine language code for a target processor or co-processor (e.g., machine language code for x86, ARM, or other suitable processor architectures, machine language code for graphical processing units, physics processing units, or other suitable processor architectures, etc.) can be translated into higher-level instructions (e.g., assembly language, intermediate language code, or human-readable languages such as C) for further analysis. The disassembled code can resolve some or all of function or method names, variable names, instruction names, and other suitable data for disassembly.

In some examples of the disclosed technology, the VnE management servers 122 and 123 serve as data repository and analysis engines for data received from one or more scanning appliances 120 and 121. The VnE management servers 122 and 123 can be configured in a passive mode, where connections from DP servers are received, but not initiated, by the VnE server. Data stored and analyzed by the VnE management server 122 includes alert configurations including application package vulnerability definitions, and vulnerability analysis data received from DP servers. In some examples, the VnE server 122 can be configured and viewed using a GUI or web browser interface. In some examples, communications to/from the VnE servers are secured using transport layer or other suitable security methods.

In some examples the central computers 120-123 (e.g., scanning appliances, VnE, and DP servers) are hosted on the same physical host, while in other examples, the central computers are hosted on different physical hosts. In some examples, virtualization technology is employed to host one or more of the central computers on the same physical host, but as different virtual machines.

The profiler processes hosted on, for examples, scanning appliances 120 and 121 include functionality for scanning a number of target devices for vulnerabilities and reporting the vulnerabilities to one or more VnE servers (e.g., servers 122 and 123). In some examples, clusters of scanning appliances each report scanning information to a different VnE server. For example, a first scanning appliance 120 can be clustered so that it communicates scan results only to its respective VnE Management Server 122, and second scanning appliance can be clustered so that it communicates scan results only to its respective VnE Management Server 123.

In the illustrated embodiment, the computing devices are configured to communicate with one or more central computers (e.g., the scanning appliances 120 and 121 or the Vulnerability and Exposure (VnE) management servers 122 and 123). In certain implementations, the central computers execute software for performing some or all of the disclosed vulnerability scanning functionalities. For example, the central computers 120-123 can transmit data to any of the computing devices (e.g., disassembly, analysis, and reporting data) as well as receive data from any of the computing devices (e.g., disassembly, analysis, and reporting data).

III. Example Method of Application Package Analysis as Practiced in Some Embodiments of the Disclosed Technology Software for computing applications is frequently distributed with the use of application packages. Such software packages facilitate distribution and installation of applications and can include a number of files. For example, software packages as can be used with the disclosed technology can include a manifest file, a certificate for the application, a signed list of resources contained in the application, executable code libraries, including processor independent and/or processor-dependent executable and intermediate language code (e.g., Java bytecode or Common Intermediate Language (CIL) code); libraries of executable and/or intermediate language code, resources, assets, object class information, header file information, precompiled resources, or other suitable application information.

Applications can be analyzed for vulnerabilities in a dynamic fashion by, for example, testing the application as it executes on a host platform or analyzing network traffic to and from the application as is executes. It is frequently desirable, however, to have the ability to scan application packages to detect certain vulnerabilities. For example, many applications might appear to have implemented proper authentication functions (e.g., functions to validate a certificate prior to sending encrypted data) but do not actually implement the functions. In these examples, further analysis is needed to determine application compliance. In some examples, a large number of applications may be stored in a central repository and available to download to the public or to subscribers of an application distribution service (e.g., the Apple App store, the Google Play store). In these cases, applying static analysis allows for scanning of a large number of applications for vulnerabilities without requiring a dynamic test environment.

Examples of vulnerabilities that can be identified using the disclose technologies include, but not are limited to, man-in-the-middle (MITM) attacks, rogue WiFi access points, and other technologies that can be left vulnerably to improper security implementations.

FIG. 2 illustrates an example of disassembled code for an authentication function contained in an application package. As shown, the decompiled method is named checkServer-Trusted, but when called, the method will return without actually performing authentication.

FIG. 3 illustrates another example of disassembled code for an authentication contained in an application package. As shown, the decompiled method is named checkServer-Trusted. The decompiled method includes instructions that can be analyzed to determine the existence of certain executable instructions associated with non-vulnerable implementations of the method.

FIG. 4 is a flow chart 400 that illustrates a method of statically checking for vulnerable applications as can be practiced in some examples of the disclosed technology. As shown in FIG. 4, after receiving an application package, at least a portion of executable code in the application package is disassembled for further analysis at process block 410. In some cases, custom disassemblers are used to decode the package, while in other examples, disassemblers such as apktool, baksmali, and dedexer can be used. Examples of disassembled code are illustrated in FIGS. 2 and 3, which are examples of Android disassembled code in Smali format.

After decompiling at least a portion of the application code, the disassembled code is searched for a pattern associated with a potentially vulnerable function at process block 420. For example, if the disassembled code includes symbol table information, the names of functions and/or methods declared in the symbol table can be searched for in disassembled code.

If the function is not defined, then the method determines that the vulnerability is not present at process block 450. This is because it is assumed that the potentially vulnerable function (e.g., a trusted function to check for certificate compliance) is likely to be implemented using the default function, which is assumed to be secured. For example, if the default function is provided by the operating system, then it can be assumed to be secure for purposes of this exemplary method.

If the function is defined in the application package, then the method proceeds to analyze the function for patterns associated with proper implementations of the function at process block 430. In some examples, the patterns searched for can include the names of functions associated with secure implementations, or the pattern searched for can be patterns of machine language or assembly language instructions that would only appear in non-vulnerable implementations.

If the pattern searched for is found, then it is determined that the vulnerability is not present in the application package. Alternatively, if the pattern searched for is not found, then it is determined that the vulnerability is present in the application package at process block 440. The pattern searched for can be for improper implementations instead of, or in addition to, proper implementations of the potentially-vulnerable function. For example, the pattern for a stub implementation of the potentially-vulnerable can be searched for.

As will be readily understood to one of ordinary skill in the relevant art, a number of techniques can be applied once a vulnerability determination is made. For example, potential vulnerabilities can be reported and system administrators notified of the potential vulnerability. In some examples, a large number of application packages can be scanned using the method of FIG. 4, and then a number of actions taken. For example, application packages determined to be vulnerable according to the method of FIG. 4 can be removed from distribution for an application store, or the owners of the application can be notified. In some examples, one or more functions associated with the application package can be disabled. For example, the function indicated to be vulnerable is associated with Secure Socket Layer (SSL) communication, the SSL protocol can be disabled for that associated application.

Figure 5:
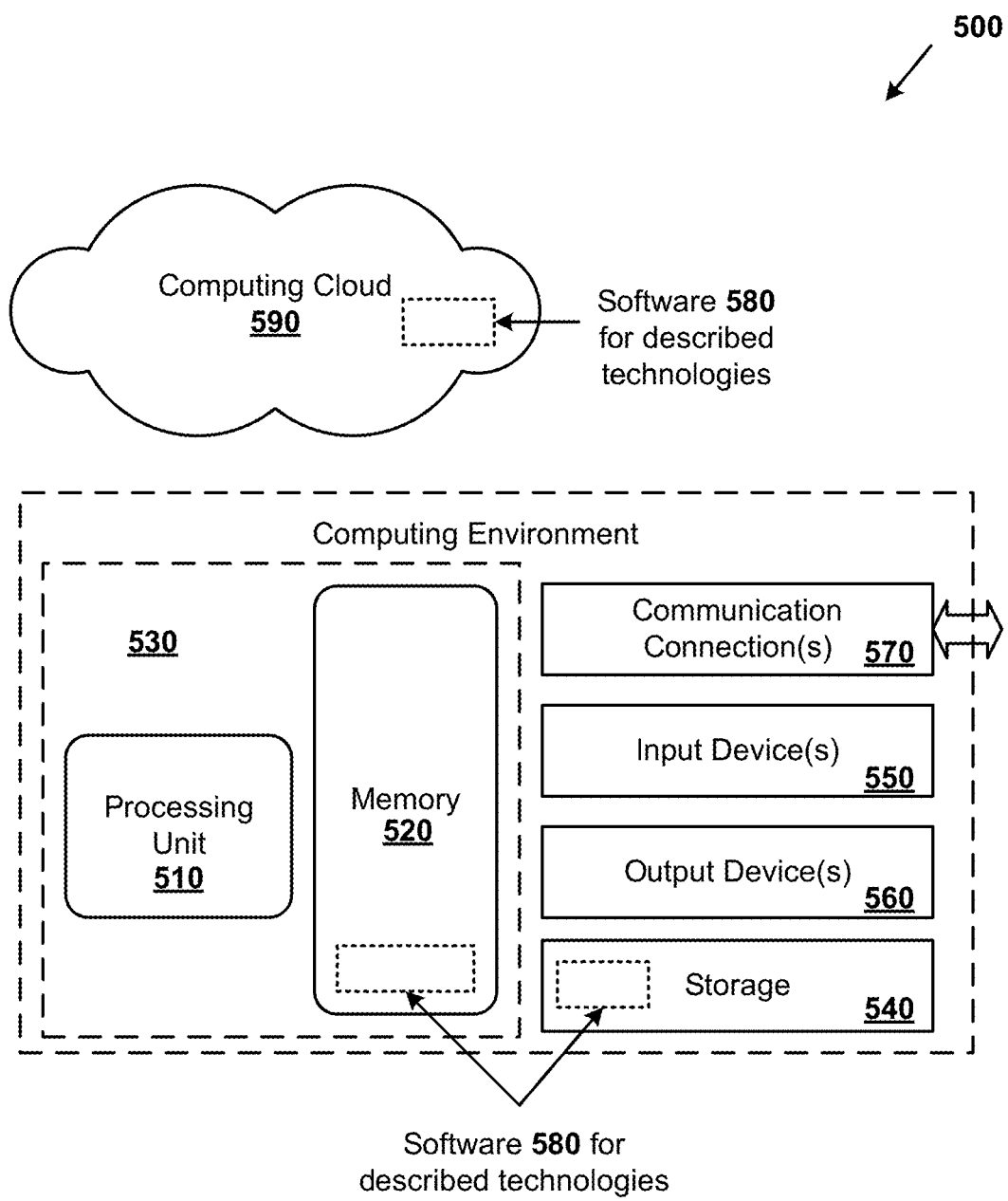
FIG. 5 illustrates a generalized example of a suitable computing environment in which described embodiments, techniques, and technologies, including reporting agents and monitor servers, can be implemented.

IV. Example Computing Environment for Implementing Embodiments of the Disclosed Technology FIG. 5 illustrates a generalized example of a suitable computing environment 500 in which described embodiments, techniques, and technologies, including reporting agents and monitor servers, can be implemented. For example, the computing environment 500 can implement any of the disclosed disassembly, analysis, and reporting functionalities, as described herein.

The computing environment 500 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 5, the computing environment 500 includes at least one central processing unit 510 and memory 520. In FIG. 5, this most basic configuration 530 is included within a dashed line. The central processing unit 510 executes computer-executable instructions and may be a real or a virtual processor. In a multi-processing system, multiple processing units execute computer-executable instructions to increase processing power and as such, multiple processors can be running simultaneously. The memory 520 may be volatile memory (e.g., registers, cache, RAM), non-volatile memory (e.g., ROM, EEPROM, flash memory, etc.), or some combination of the two. The memory 520 stores software 580, images, and video that can, for example, implement the technologies described herein. A computing environment may have additional features. For example, the computing environment 500 includes storage 540, one or more input devices 550, one or more output devices 560, and one or more communication connections 570. An interconnection mechanism (not shown) such as a bus, a controller, or a network, interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and that can be accessed within the computing environment 500. The storage 540 stores instructions for the software 580 tools and data for application disassembly and analysis, which can implement technologies described herein.

The input device(s) 550 may be a touch input device, such as a keyboard, keypad, mouse, touch screen display, pen, or trackball, a voice input device, a scanning device, or another device, that provides input to the computing environment 500. For audio, the input device(s) 550 may be a sound card or similar device that accepts audio input in analog or digital form, or a CD-ROM reader that provides audio samples to the computing environment 500. The output device(s) 560 may be a display, printer, speaker, CD-writer, or another device that provides output from the computing environment 500.

The communication connection(s) 570 enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud 590. For example, static analysis of vulnerabilities in application packages can be executed in the computing environment 530 (e.g., by a scanning appliance 120), while collection of analysis data can be performed on remote servers located in the computing cloud 590 (e.g., by a VnE management server 122).

Computer-readable media are any available media that can be accessed within a computing environment 500. By way of example, and not limitation, with the computing environment 500, computer-readable media include memory 520 and/or storage 540. As should be readily understood, the term computer-readable storage media includes the media for data storage such as memory 520 and storage 540, and not transmission media such as modulated data signals.

Additional examples of the disclosed technology are included in Appendix A, the entire disclosure of which is submitted herewith.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

I claim:

1. A method performed by one or more processors for statically analyzing an application package for vulnerabilities, the method comprising:
   disassembling at least a portion of executable code for an application;
   searching the disassembled code for a definition of a potentially-vulnerable function;
   determining that the potentially-vulnerable function is defined and analyzing a portion of the disassembled code associated with the potentially-vulnerable function, wherein the analyzing comprises:
searching the disassembled code associated with the potentially-vulnerable function for executable instructions associated with a non-vulnerable implementation of the potentially-vulnerable function, and
determining, based on an absence of the executable instructions that at least one vulnerability associated with the potentially-vulnerable function is present; and
based on the analysis, disabling the potentially-vulnerable function in the application and reporting a potential vulnerability in the potentially-vulnerable function.

2. The method of claim 1, further comprising, if the searching does not find the function definition, then indicating that at least one vulnerability associated with the function is not present in the application.

3. The method of claim 1, wherein the application package is an Android application package.

4. The method of claim 1, wherein the disassembling is performed using at least one or more of the following tools: apktool, baksmali, or dedexer.

5. The method of claim 1, wherein the application package is stored in an application store accessible via the Internet.

6. The method of claim 1, wherein:
the application package is stored in an application store accessible via the Internet;
a plurality of applications are stored in the application store; and
the method further comprises, for each one of a respective two or more of the plurality of applications, repeating the disassembling, the searching, and the analyzing.

7. The method of claim 1, wherein the potentially-vulnerable function is associated with Secure Socket Layer (SSL) communication, wherein the method further comprises disabling SSL protocol for the application package.

8. One or more non-transitory computer-readable storage media storing computer-readable instructions that, when executed by a computer, cause the computer to perform a method, comprising:
disassembling at least a portion of executable code for an application;
searching the disassembled code for a definition of a potentially-vulnerable function;
determining that the potentially-vulnerable function is defined in the disassembled portion of the executable code and analyzing the disassembled portion of the executable code, wherein the analyzing comprises:
searching the disassembled portion of the executable code for executable instructions associated with a non-vulnerable implementation of the potentially-vulnerable function, and
determining, based on an absence of the executable instructions that at least one vulnerability associated with the potentially-vulnerable function is present; and
based on the analysis, disabling the potentially-vulnerable function of the application and reporting a potential vulnerability in the potentially-vulnerable function.

9. A system, comprising:
memory;
one or more processors couple to the memory;
one or more non-transitory computer-readable media storing computer-readable instructions that, when executed by the processors, cause the processors to perform a method of statically analyzing an application package for vulnerabilities, the instructions comprising:
instructions for a disassembler, the disassembler being configure to disassemble executable code;
instructions for searching disassembled code for a definition of a potentially-vulnerable function
instructions for, determining that the potentially-vulnerable function is defined and analyzing a portion of the disassembled code associated with the potentially-vulnerable function, wherein the analyzing comprises:
searching the disassembled code associated with the potentially-vulnerable function for executable instructions associated with a non-vulnerable implementation of the potentially-vulnerable function, and
determining, based on an absence of the executable instructions that at least one vulnerability associated with the potentially-vulnerable function is present; and
instructions for disabling the potentially vulnerable function in the application based on the analysis and reporting a potential vulnerability in the potentially-vulnerable function.

10. The system of claim 9, wherein the instructions further comprise:
instructions for, if the certain instructions are identified by the analyzing, then indicating that the at least one vulnerability associated with the potentially-vulnerable function is not present.

11. The system of claim 9, wherein the instructions further comprise:
instructions for providing an application store accessible via a computer network.

12. The system of claim 9, further comprising:
a database storing executable code for a plurality of application packages; and
wherein the instructions further comprise, for two or more application packages of the plurality of application packages, instructions for periodically repeating execution of the instructions for: the disassembler, performing the searching, and performing the analyzing.

13. The system of claim 9, wherein the instructions further comprise:
instructions for, based on the analyzing, preventing distribution of the application package.

14. The system of claim 9, wherein the instructions further comprise:
instructions for determining whether the potentially-vulnerable function is associated with a security implementation; and
based on the determining, disabling the potentially-vulnerable function.

15. The system of claim 9, wherein the instructions for the disassembler comprise instructions for extracting at least one or more of the following:
a certificate associated with the application package;
a digest associated with components of the application package;
native compiled code;
bytecode;
a manifest in eXtensible Markup Language (XML) format; or
code compiled in dex format.

16. The system of claim 9, wherein the instructions further comprise:
instructions for extracting function names from a symbol table of the application package.

17. The system of claim 9, wherein the application package is a medical application, a home security application, a home automation application, or a smartphone application.

\* \* \* \* \*

UNITED STATES PATENT AND TRADEMARK OFFICE
CERTIFICATE OF CORRECTION

PATENT NO. : 10,242,200 B1
APPLICATION NO. : 15/061880
DATED : March 26, 2019
INVENTOR(S) : Young It is certified that error appears in the above-identified patent and that said Letters Patent is hereby corrected as shown below:

On the Title Page

Item (57), In the Abstract, Line 8:
"vulnerably function" should read --vulnerable function--

Signed and Sealed this
Twenty-second Day of September, 2020

Andrei Iancu
*Director of the United States Patent and Trademark Office*